United States Patent [19]

Ibamoto et al.

[11] Patent Number: 5,508,923
[45] Date of Patent: Apr. 16, 1996

[54] ENGINE CONTROL SYSTEM LIMITING ENGINE OUTPUT BASED ON VEHICLE OPERATING ENVIRONMENTS

[75] Inventors: Masahiko Ibamoto; Hiroatsu Tokuda; Michimasa Horiuchi; Naoyuki Ozaki; Yutaka Nishimura, all of Katsuta, Japan

[73] Assignee: Hitachi, Ltd., Japan

[21] Appl. No.: 21,081

[22] Filed: Feb. 23, 1993

[30] Foreign Application Priority Data

Feb. 28, 1992 [JP] Japan ................................. 4-043359

[51] Int. Cl.$^6$ ................................................. B60L 15/20
[52] U.S. Cl. ................................. 364/426.01; 364/424.1
[58] Field of Search ......................... 477/43, 63, 98; 180/179; 364/426.02, 424.05, 424.01; 123/422

[56] References Cited

U.S. PATENT DOCUMENTS

| | | | |
|---|---|---|---|
| 4,346,776 | 8/1982 | Taplin | 180/179 |
| 4,414,863 | 11/1983 | Heino | 477/63 |
| 4,807,497 | 2/1989 | Yasue et al. | 477/98 |
| 5,084,821 | 1/1992 | Ohsuga et al. | 364/424.05 |
| 5,097,809 | 3/1992 | Sekozawa et al. | 123/422 |
| 5,150,635 | 9/1992 | Minowa et al. | 477/43 |
| 5,151,861 | 9/1992 | Danno et al. | 364/426.02 |

FOREIGN PATENT DOCUMENTS

| | | |
|---|---|---|
| 3504197C2 | 8/1985 | Germany. |
| 4040066A1 | 7/1991 | Germany. |

*Primary Examiner*—Kevin J. Teska
*Assistant Examiner*—Dan Fiul
*Attorney, Agent, or Firm*—Evenson, McKeown, Edwards & Lenahan

[57] ABSTRACT

The invention provides a system for controlling a vehicle engine according to a plurality of stored torque patterns for various vehicle operating environments, based upon the accelerator pedal position and the vehicle speed. A vehicle environment detection unit evaluates the vehicle environment and a target drive shaft torque pattern is selected from the plurality of target drive shaft torque patterns stored in a torque pattern storage. A target drive shaft torque calculating unit determines a target drive shaft torque from the selected target drive shaft torque pattern, the detected accelerator pedal operating amount and the detected vehicle speed. Finally, an engine output calculator determines an engine output at which a vehicle drive shaft generates the target drive shaft torque, and outputs the determined engine output to an engine output control unit.

15 Claims, 11 Drawing Sheets

ENGINE CONTROL SYSTEM LIMITING ENGINE OUTPUT BASED ON VEHICLE OPERATING ENVIRONMENTS

BACKGROUND OF THE INVENTION

1. Field of the Invention

The present invention relates to a method and apparatus for controlling an engine, and especially to a method and apparatus for controlling an engine by providing a signal indicative of a desired engine output level to an engine control means such as an electronically controlled throttle valve.

2. Related Art

One prior art method of actively controlling the drive shaft torque of an automobile is disclosed in JP-A-2-201061 (1986).

This control method comprises preliminarily storing a target drive shaft torque pattern depending upon the vehicle speed and the accelerator pedal position in a memory or the like; determining a target drive shaft torque value from the current vehicle speed and accelerator pedal position, determining a target engine torque value from the target drive shaft torque and the gear ratio of a transmission and controlling the throttle valve opening so that the target engine torque value is obtained.

This control method aims at providing the acceleration which satisfies the driver's taste or at which driving is easy by using such a target drive shaft torque curve However, the throttle valve opening in such prior art is independent of the operating conditions in which the vehicle is operate, while the vehicle speed is dependent on the accelerator pedal position, when the vehicle environment changes (for example the vehicle moves from lower elevations to higher elevations, or a heavy load is placed on the vehicle), a constant acceleration cannot be obtained even if the vehicle speed is dependent on the accelerator pedal position. An acceleration which satisfied the driver's taste or at which driving is easy can not be obtained.

SUMMARY OF THE INVENTION

The present invention was made for overcoming the above mentioned problem.

It is therefore an object of the present invention to provide an engine control method and an engine control system which is capable of providing an acceleration which satisfies the driver's taste or at which driving is easy, even if the vehicle environment changes.

In a first embodiment of the present invention there is provided an engine control system for controlling an engine by generating a signal indicative of a desired engine output level and providing each signal to an engine control unit, comprising: accelerator pedal angle detecting means for detecting the position (that is, the extent of depression) of an accelerator pedal; vehicle speed detecting means for detecting the vehicle speed; torque pattern storing means for each vehicle environment for storing target drive shaft torque patterns to be accessed depending upon the accelerator pedal position and the vehicle speed; vehicle environment detection means for recognizing various vehicle operating environments to select a target drive shaft torque pattern from a plurality of target drive shaft torque patterns stored in the torque pattern storing means; target drive shaft torque calculating means for determining a target drive shaft torque from the selected target means.

In another embodiment of the present invention, there is provided an engine control system for controlling an engine by generating a signal indicative of a desired engine output level and providing such signal to engine control means; comprising: accelerator pedal angle detecting means for detecting the position of an accelerator pedal; vehicle speed detecting means for detecting the vehicle speed; torque pattern storing means for each vehicle environment for storing target drive shaft torque patterns to be accessed depending upon the accelerator pedal position and the vehicle speed; target acceleration calculating means for determining the target acceleration by dividing the determined target drive shaft torque by the vehicle weight; acceleration error calculating means for determining the error between the target acceleration and the vehicle acceleration; and engine output calculating means for determining an engine output parameter at which said determined error decreases, and for outputting the determined engine output parameter to said engine control means.

In yet a further embodiment if the present invention, there is provided an engine control system for controlling an engine by generating a signal indicative of a desired engine output level and providing such signal to engine means; comprising: accelerator pedal angle detecting means for detecting the position of an accelerator pedal; vehicle speed detecting means for detecting the vehicle speed; torque pattern storing means for each vehicle environment for storing target drive shaft torque patterns to be accessed depending upon the accelerator pedal position and the vehicle speed; engine output pattern storing means for storing an engine output pattern representative of the relation between the drive shaft torque and and engine output parameter; target drive shaft torque calculating means for determining the target drive shaft torque from the target drive shaft torque patterns, the detected accelerator pedal position and the detected vehicle speed; calculating means for determining a pattern and engine output calculating means for determining an engine output parameter from the determined target drive shaft torque and the engine output pattern and for providing the engine output parameter to the engine control means; acceleration calculating means for determining the vehicle acceleration based upon the vehicle speed at predetermined time intervals; target acceleration calculating means for determining the vehicle acceleration based upon the vehicle speed at predetermined time intervals by dividing the determined drive shaft torque by the vehicle weight; acceleration error calculating means for determining the error between the target acceleration and the actual vehicle acceleration; and engine output parameter correcting means for correcting the engine output pattern so that the determined error decreases.

The engine control system including vehicle environment sensing means has the ability to determined, for example, when the vehicle is running on an uphill road, or when a higher freight is loaded. When such an operational environment is recognized, a corresponding target drive shaft torque pattern is selected from the plurality of target drive shaft torque patterns stored in the torque pattern storing means.

The target drive shaft torque calculating means determines the target drive shaft torque from the selected target drive shaft torque pattern, the vehicle speed which is detected by the vehicle speed detecting means and the accelerator pedal position which is detected by the accelerator pedal angle detecting means.

The engine output calculating means determines the engine output parameter at which the vehicle drive shaft generates the target drive shaft torque, and outputs it to the engine control means.

Since the vehicle environment is recognized and the target drive shaft torque is determined accordingly, an acceleration which satisfies the driver's taste or at which driving is easy can be obtained even if the vehicle operating environment changes.

In the engine control system including the acceleration calculating means, the target drive shaft torque is determined from the stored target drive shaft torque pattern, the detected accelerator pedal position and the detected vehicle speed.

The target acceleration calculating means determines the target acceleration from the determined target drive shaft torque. The acceleration error calculating means determines the error between the target acceleration and the actual acceleration.

The engine output calculating means determines an engine output parameter which decreases the acceleration error and outputs it to the engine control means.

The engine is controlled in such a manner that the error between the target acceleration and the actual acceleration will decrease even if the target acceleration is not obtained due to the change in the vehicle environment as mentioned above. The engine control system is capable of coping with the change in the vehicle environment similarly to the foregoing system.

Other objects, advantages and novel features of the present invention will become apparent from the following detailed description of the invention when considered in conjunction with the accompanying drawings.

DESCRIPTION OF THE EMBODIMENTS

Various embodiments of the present invention will be described with reference to drawings. Like components are represented by like numerals throughout the drawings. Duplication of description of like components will be omitted herein.

Now, a first embodiment of an engine control apparatus will be described with reference to FIGS. 1 through 6.

Figure 1:
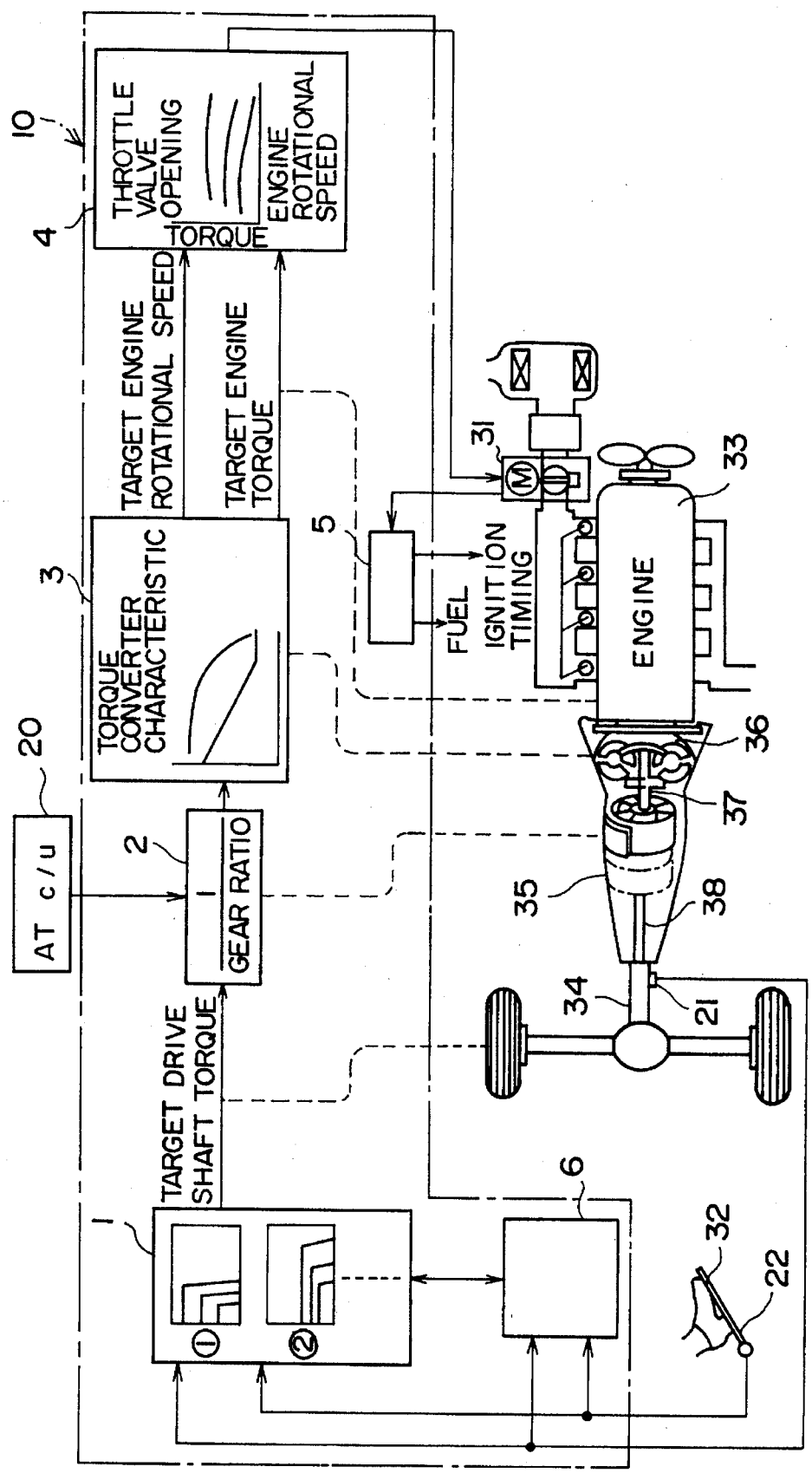
FIG. 1 is a functional block diagram showing an engine control system of a first embodiment of the present invention.

The engine control system of the present embodiment comprises an engine control unit 10, a vehicle speed sensor 21, and an accelerator pedal angle sensor 22 as shown in FIG. 1.

The engine control unit 10 comprises a target drive shaft torque calculating unit 1 for calculating the target torque of a driven shaft depending upon the vehicle speed, the accelerator pedal angle or stroke and the vehicle environment, a transmission input shaft torque calculating unit 2 for converting the target drive shaft torque into the torque of an input shaft 37 of a transmission, an engine torque calculating unit 3, a throttle valve opening calculating unit 4, a fuel injection and ignition control unit 5 for controlling the fuel injection amount and ignition timing and a vehicle environment detection unit 6 for detection the vehicle environment based upon the outputs from various sensors 21 and 22.

Figure 3:
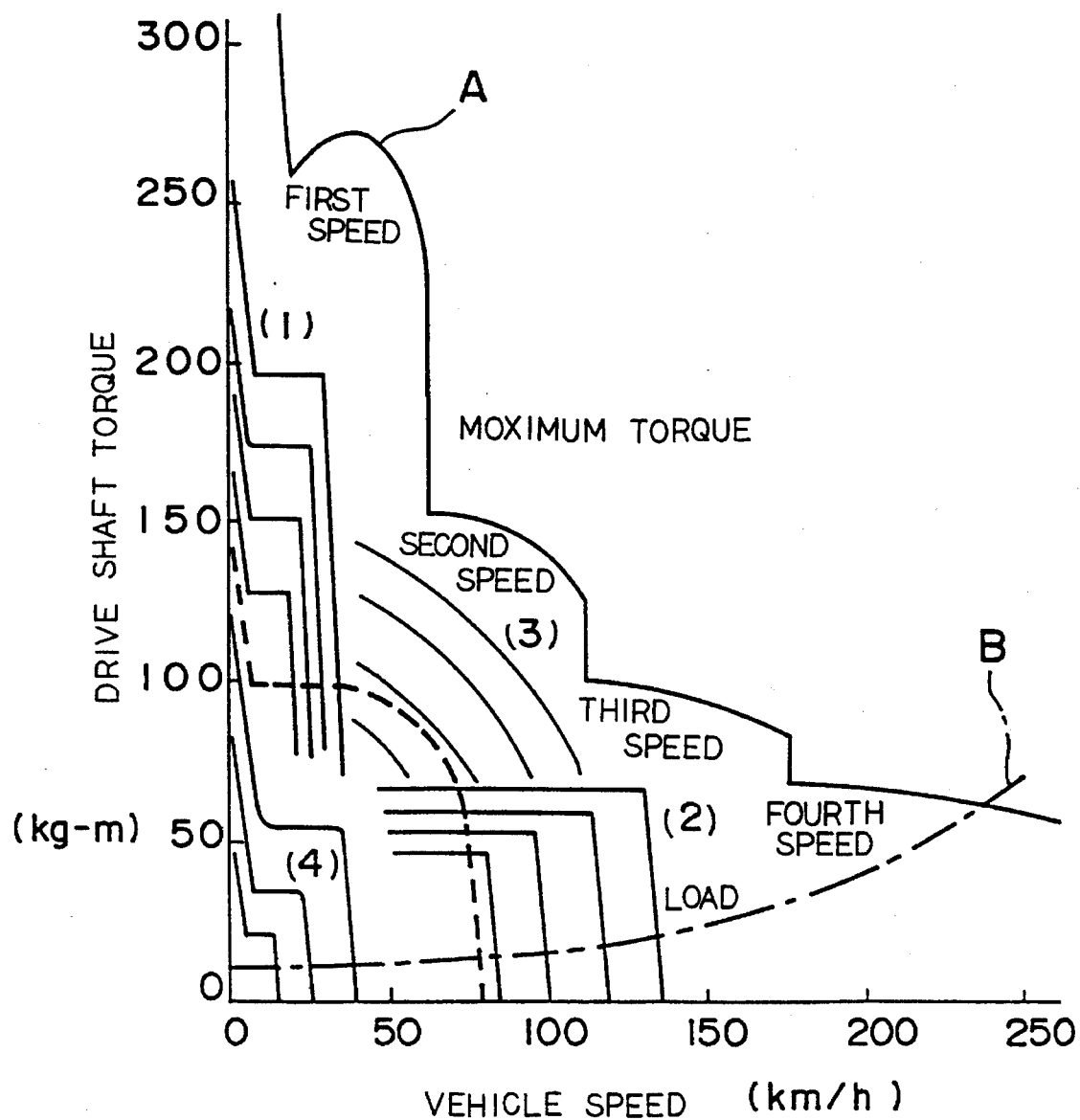
FIG. 3 is a graph showing target drive shaft torque patterns in the first embodiment of the present invention.
Figure 4:
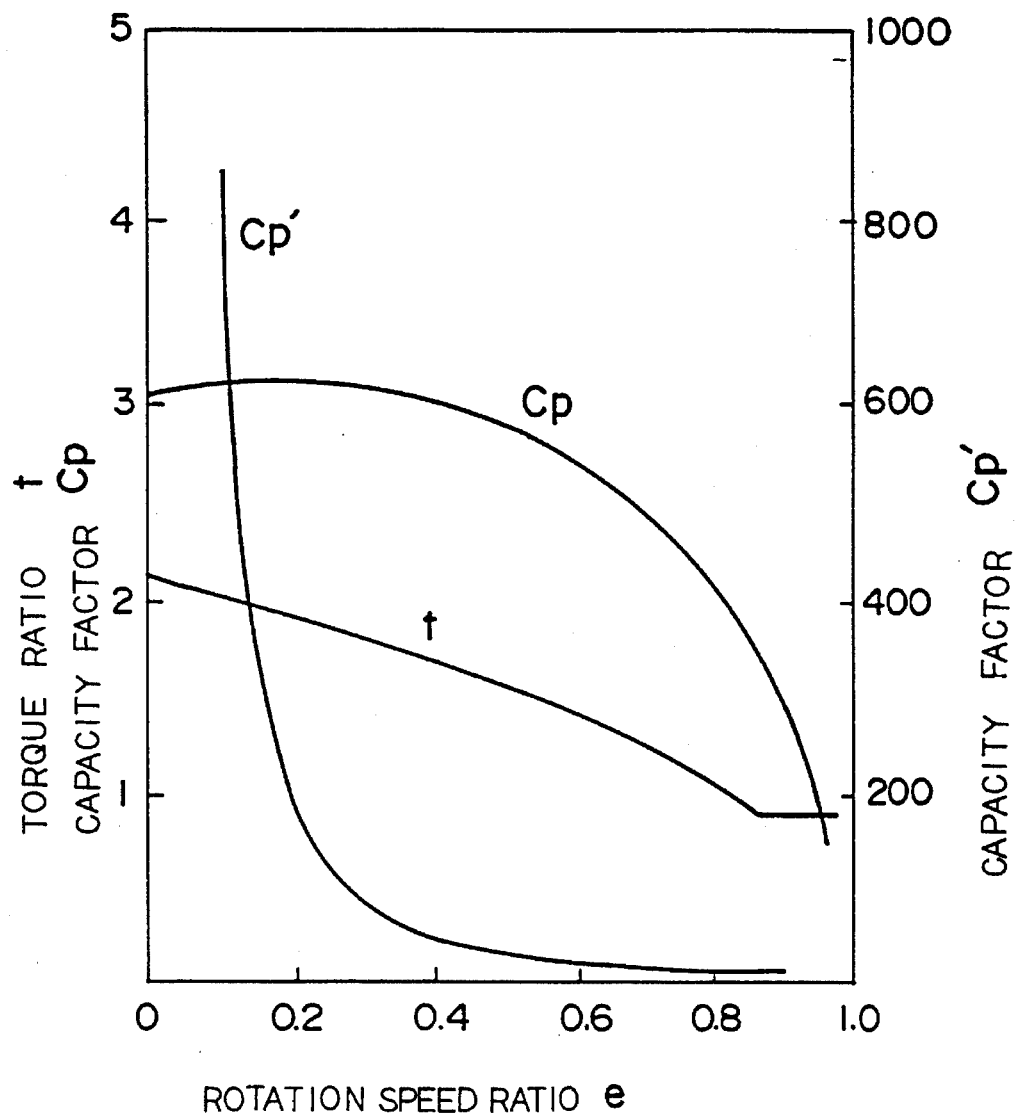
FIG. 4 is a graph showing the characteristics of a torque converter.
Figure 5:
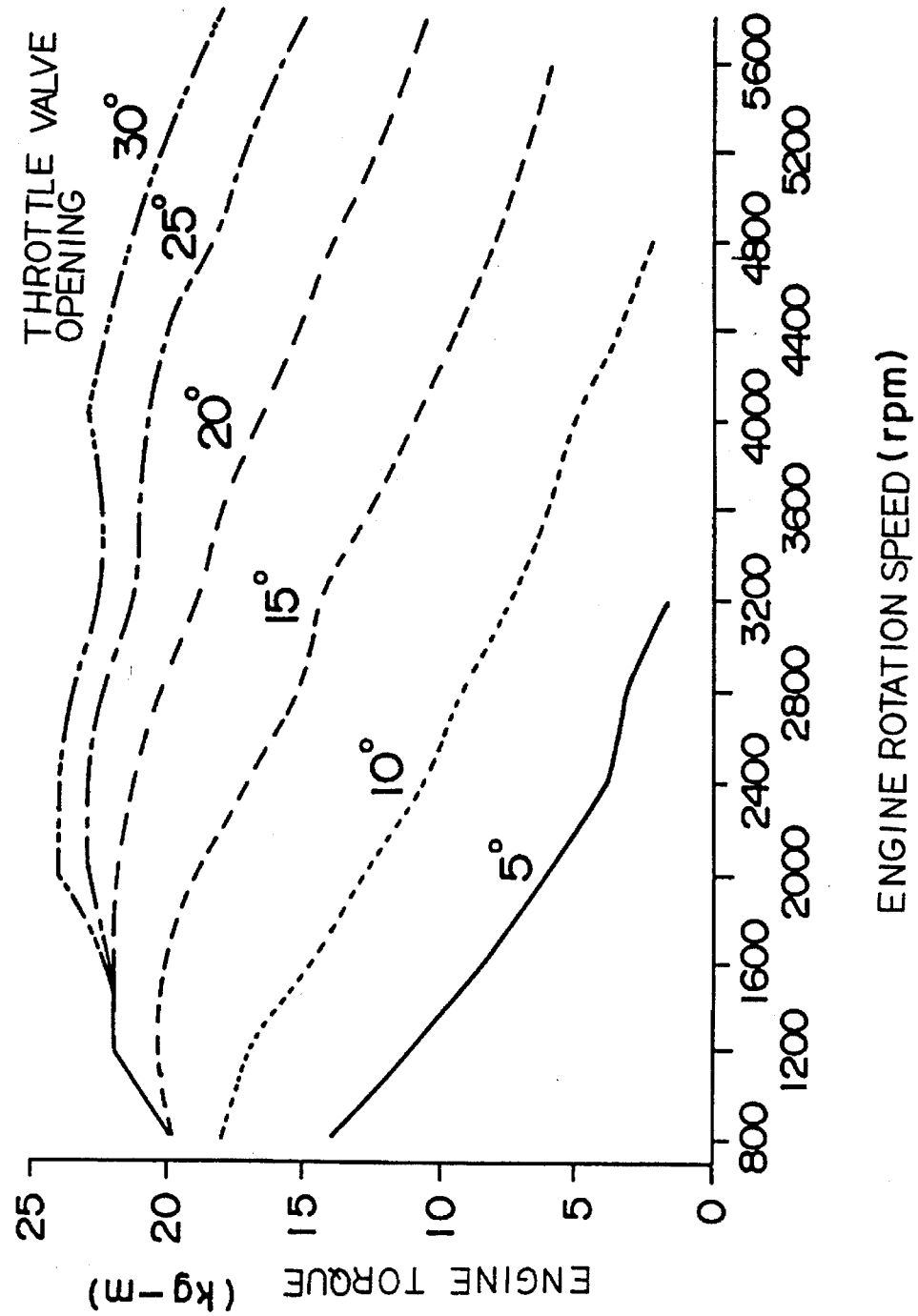
FIG. 5 is a graph showing the torque characteristics of an engine.

Target drive shaft torque patterns depending upon the vehicle speed and the accelerator pedal angle for respective vehicle environments are preliminarily stored in the target drive shaft torque calculating unit 1 as shown in FIG. 3. Torque characteristics of a torque converter 36 and an engine 33 are preliminarily stored in the engine torque calculating unit 3 and the throttle valve opening calculating unit 4 as shown in FIGS. 4 and 5, respectively.

Figure 2:
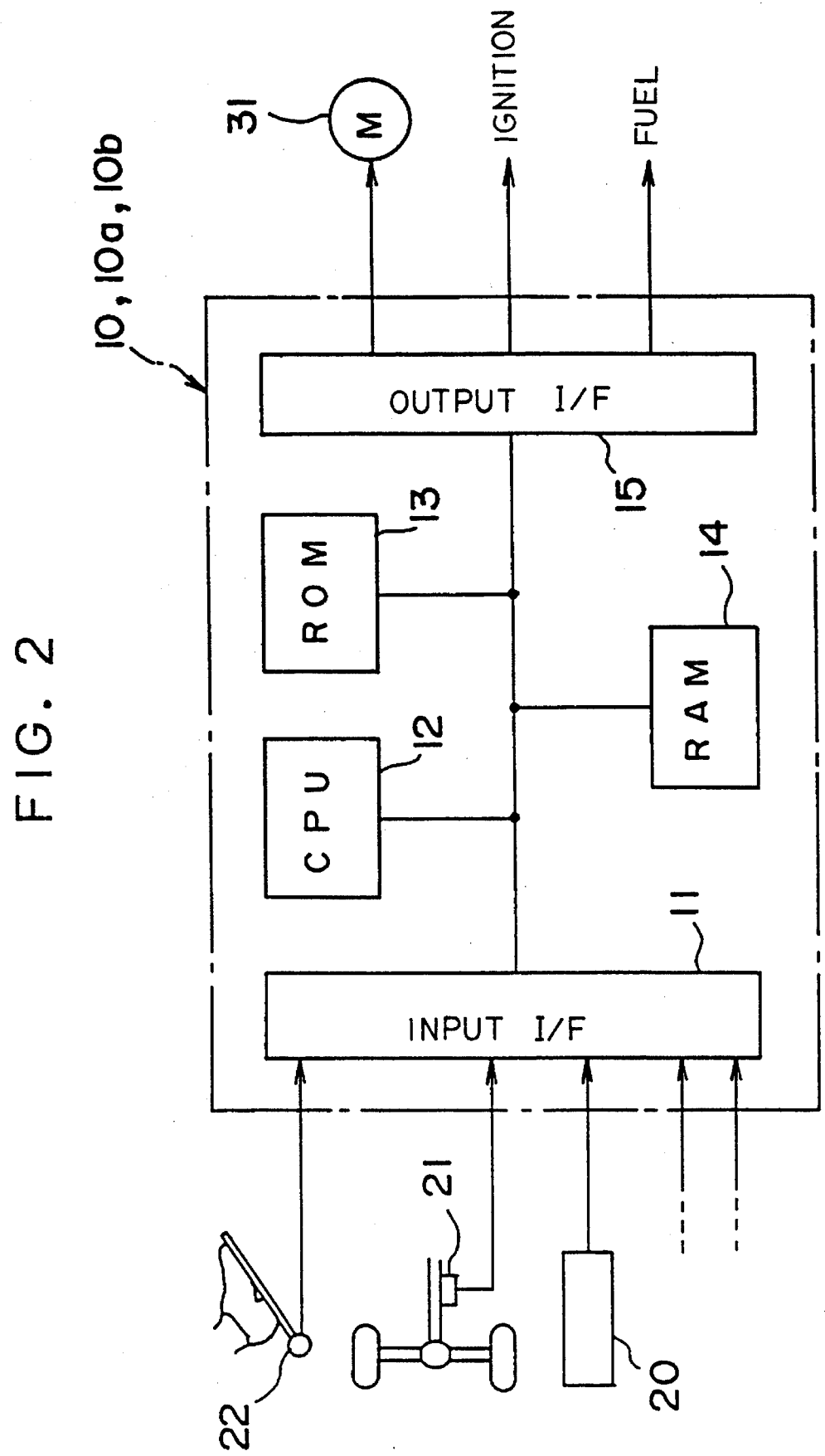
FIG. 2 is a circuit block diagram showing an engine control unit in the first embodiment of the present invention.

The functional configuration of the engine control unit 10 has been described. In practice, the engine control unit 10 comprises an input interface circuit 11, a CPU 12 for performing various operations, ROM 13 and RAM 14 for storing various data and programs, etc. and an output interface circuit 15 as shown in FIG. 2. That is, various target drive shaft torque patterns, torque converter characteristics and engine characteristics, etc. are mapped in the RAM 14. The operation programs which are executed by the calculation units 1, 2, . . . are stored in the ROM 13. Functions of the calculating unit 1, 2, . . . are achieved by the CPU 12 executing programs and data stored in the RAM 13 and ROM 14.

In the present embodiment, torque pattern storing means and target drive shaft torque calculating means are constituted by the target drive shaft calculating unit 1, and the engine output calculating means is constituted by the transmission input shaft torque calculating unit 2, the engine torque calculating unit 3 and the throttle valve opening calculating unit 4. Engine control means is formed by an electronically controlled throttle valve 31.

Operation of the present embodiment will be described. From the outputs from the sensors 21 and 22 the vehicle environment detection unit 6 determines whether the vehicle is running uphill or running on a crowded road. A method of recognizing the vehicle environment will be described hereafter.

If the vehicle environment is detected by the vehicle environment detection unit 6, the target drive shaft torque calculating unit 1 selects a drive shaft torque pattern in a mode corresponding to the recognized vehicle environment selected from the preliminarily stored plural target drive shaft torque patterns.

The drive shaft torque patterns in respective modes will be described with reference to FIG. 3. In the drawings, abscissa and ordinate denote vehicle speed (km/h) and drive shaft torque (kg–m) respectively. A reference character A in the drawing denotes a drive shaft torque curve at a full stroke of an accelerator pedal 32, that is, the maximum drive shaft torque curve in a case where the accelerator pedal 32 is mechanically linked with a throttle valve. Therefore a drive shaft torque which is lower than the maximum driven shaft torque can be generated.

The modes of the target drive shaft torque patterns include (1) hill climb mode, (2) highway mode, (3) normal mode and (4) low speed mode.

In each mode, a plurality of target drive shaft torque patterns corresponding to various accelerator pedal angles, are preset.

It is preferable from the standpoint of drivability that substantially the same acceleration be obtained at the same angle of the accelerator pedal 22 both on an uphill and flat road. Accordingly, the target drive shaft torque is preset higher at a relatively low speed in the hill climb mode (1).

In the highway mode, the target drive shaft torque characteristic curve is preset in such a manner that the drive shaft torque is constant and remains relatively low until a given speed, and suddenly decreases when the speed exceeds the given speed.

In a case where the accelerator pedal 32 is mechanically linked with the throttle valve, the drive shaft torque characteristics generally hardly change as represented by the maximum drive shaft torque curve A even if the vehicle speed changes. Accordingly, if it is attempted to keep the speed approximately at the point where it intersects with a load curve B, the load curve B is only changed slightly along the ordinate and the vehicle speed varies, resulting in a poor stability in vehicle speed. Therefore, the highway mode (2) is preset in such a manner that a constant drive shaft torque is generated below a predetermined speed even if the vehicle speed is changed, so that a predetermined acceleration is obtained; and when the vehicle speed exceeds the predetermined speed, the drive shaft torque curve decreases so that it will substantially normally intersect with the load curve B resulting in a highly stable in vehicle speed.

The low speed mode (4) is preset to provide a drive shaft torque curve in which the drive shaft torque is high to overcome a static friction coefficient on starting, and the drive shaft torque and the stable vehicle speed are proportional to the angle of the accelerator pedal 32 immediately after starting. The drive shaft torque curve is, of course, preset in a low speed range.

The normal mode (3) is preset to provide a drive shaft torque characteristic between the hill climb mode (1) or low speed mode (4) and the highway mode (2). That is, the drive shaft torque is smoothly lowered with increase in speed in an intermediate speed range so that the output is not substantially changed.

When a mode corresponding to the vehicle environment is selected, a target drive shaft torque is determined in accordance with the target drive shaft torque pattern of the selected mode, based upon the outputs from the vehicle speed sensor 21 and the accelerator pedal angle sensor 22.

The transmission input shaft torque calculating unit 2 converts the previously determined target drive shaft torque into the torque of an input shaft 37 based upon information on the gear ratio which is provided from the transmission control unit 20 for determining the target transmission input shaft torque. The torque converter 36 has the capability of amplifying the torque due to slippage occurring between a pump and a turbine. Accordingly, it is necessary to calculate the target engine torque from a torque gain and the target engine rotational speed by compensating for the slippage.

The characteristic of the torque converter is generally represented by a ratio of torques of input to output $t=T_2/T_1$ and a capacity factor $Cp=T_1/n_1^2$. These are shown in FIG. 4 in which the abscissa denotes the ratio of the rotational speeds of input to output $e=n_2/n_1$ wherein in denotes the input rotation speed (the number rotations of the engine); $n_2$ denotes the output rotational speed (the number of rotations of the transmission input shaft); $T_1$ denotes input torque (engine torque) and $T_2$ denotes an output torque (transmission input shaft torque).

The capacity coefficient Cp is a characteristic of the torque converter, which is defined by the dimension and structure thereof. Although the capacity coefficient is represented by the input torque $T_1$ and the input rotational number $n_1$, the capacity coefficient Cp' can be represented by the output torque $T_2$ and the output rotational number $n_2$ in accordance with equation 1 as follows:

$$Cp'=T_2/n_2^2=tCp/e^2 \tag{1}$$

The capacity coefficient Cp' is determined by representing the previously determined target transmission input torque and the number of rotations of the transmission input shaft at this time as $T_2$ and $n_2$, respectively. Since the rotational speed ratio e and the torque ratio t are determined from the characteristics of the torque converter shown in FIG. 4, if the capacity coefficient Cp' is determined, the target engine torque and the target engine rotational speed are determined.

Although factors such as the temperature of the torque converter oil herein are not considered, it is preferable to correct changes in torque converter characteristics due to changes in oil temperature in a practical control.

The throttle valve opening calculating unit 4 calculates the throttle valve opening from the engine torque characteristic which were preliminarily stored as shown in FIG. 5, the target engine torque value which was determined in the engine torque calculating unit 3 and the target engine rotational speed value.

The throttle valve opening determined in this manner is input to an electronically controlled throttle valve 31 as a signal so that the determined throttle opening is set.

Optimum fuel injection amount and ignition timing depending upon the preset throttle valve opening, are determined in the fuel injection and ignition control unit 5. Control is performed to provide the fuel injection amount and ignition timing so that the target drive shaft torque value is obtained.

Figure 6:
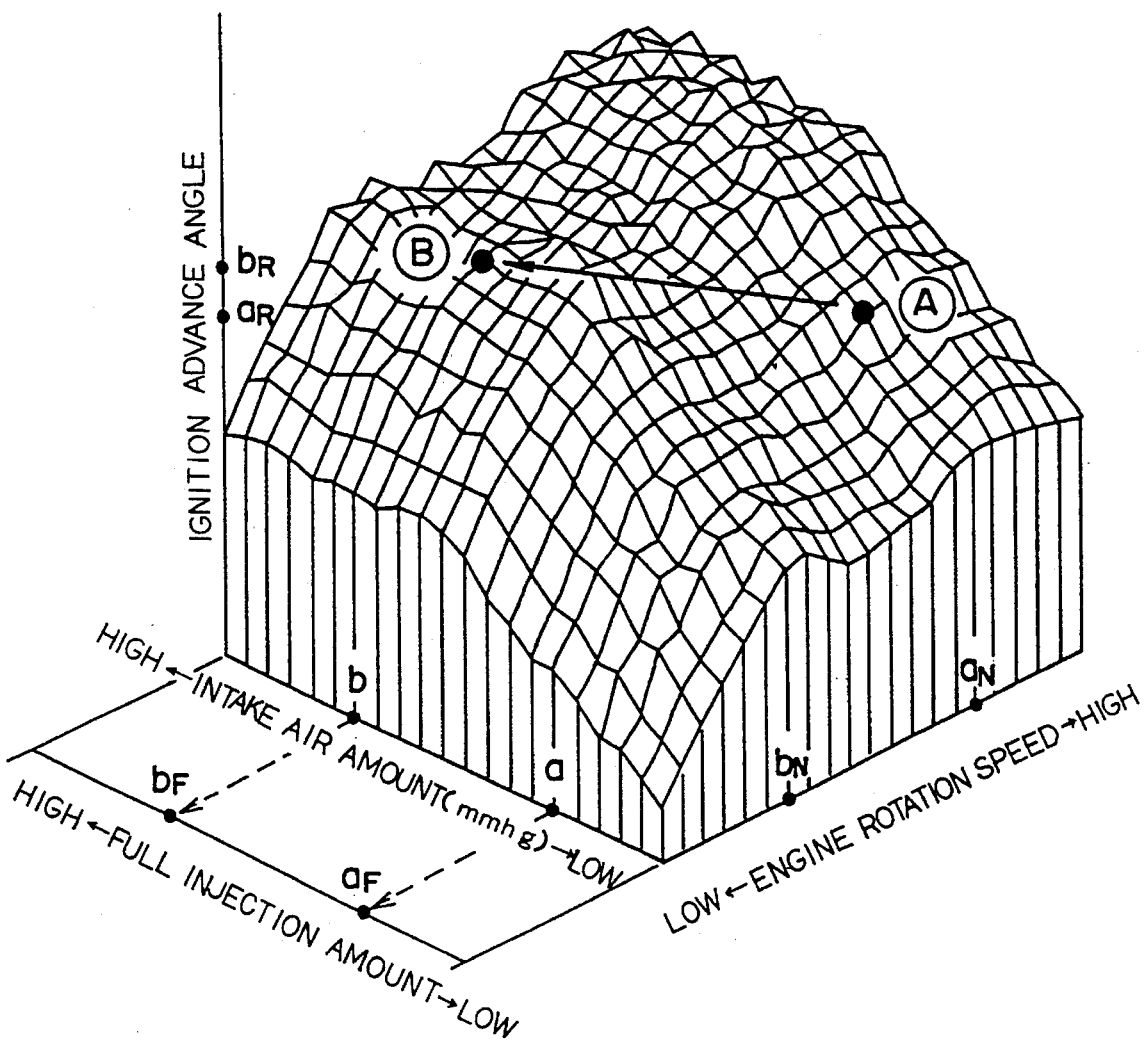
FIG. 6 is an explanatory view showing an optimum ignition advance angle map in the first embodiment of the present invention.

A map which represents the relation between the optimum ignition advance angle, the intake mass air flow and the engine rotational speed as shown in FIG. 6 is preliminarily stored in the fuel injection and ignition control unit 5.

If the throttle valve opening is changed to change the intake air mass flow from point a to point b in FIG. 6, corresponding fuel injection amounts aF and bF are determined to maintain the stoichiometric air/fuel ratio. If the intake air mass amount and the fuel injection amount are changed, the engine rotational speed is changed from point aN to point bN. The ignition advance angle bR is then determined from the intake air mass amount a and the engine rotational speed bN which is determined by using the map. The fuel injection amount and the ignition timing are determined as mentioned above.

Vehicle environment recognition in the vehicle environment detection unit 6 and selection of various modes will now be described. Output signals from the vehicle speed sensor 21 and the accelerator pedal angle sensor 22 are successively input to the vehicle environment detection unit 6 where they are stored for a predetermined period of time for the vehicle environment can be determined from the history of the vehicle speeds and the accelerator pedal angles stored in that period.

Since the load torque is increased on climbing a hill even if control is performed for a predetermined period of time to provide a target value of the drive shaft torque, a vehicle speed corresponding to the target value of the drive shaft torque can not be obtained. At high elevations, the air is lean and an air mass amount depending upon the throttle valve opening corresponding to the target value of the drive shaft can not be obtained even if this throttle valve opening is maintained. Accordingly, a vehicle speed corresponding to the target value of the drive shaft torque can not be obtained, similarly to uphill climbing. Therefore, it is determined that the vehicle is running uphill or at a high elevation when the vehicle speed corresponding to the target value of the drive shaft torque can not be obtained for a predetermined period of time. When it is determined that the vehicle is running uphill or on In this case, the uphill climb mode (1) or the intermediate mode (3) is selected depending upon the vehicle speed. In other words, the uphill climb mode (1) is selected since the vehicle speed on running uphill including an uphill climb at a high elevations is generally not high. The intermediate mode (3) is selected since the drive shaft torque is high to some extent and it suffices for the vehicle to accelerate to a high speed range to some extent on running on a flat road even at high elevations.

Starting and slow speed driving are generally performed repeatedly on a crowded road, while high speed running is generally continued for a given period of time on a highway. Accordingly, if starting and slow speed driving are repeated, it is determined from the history of the vehicle speed that the road is crowded and slow speed mode (4) is selected. In the low speed mode (4), the target value of the drive shaft torque is preset to a high value to overcome the static friction coefficient on starting as mentioned above, and the target value of the drive shaft torque is preset so that the torque and the stable vehicle speed are proportional to the depression angle or stroke of the accelerator pedal immediately after starting. Accordingly, very easy driving is possible on running on a crowded road in which starting and slow driving is repeated. Since the target value of the drive shaft torque is preset so that its curve will substantially normally intersect with a load curve B, the vehicle speed will not changed even if the load curve b changes. Vehicle speed stability can be enhanced. The fact that the target value of the drive shaft torque is preset to a relatively low value enhances in the vehicle speed stability.

The actual vehicle speed will exceed an intended vehicle speed at the target value of the drive shaft torque on a downhill road conversely to the case of the above mentioned uphill climb. If the vehicle speed which exceeds the intended vehicle speed is continued for a predetermined period of time, it is determined that the vehicle is running downhill and the low speed mode (4) will be selected. Since the target value of the drive shaft torque is not preset to a high value in the low speed mode (4), no excess torque is generated and since the target value of the drive shaft torque is preset so that it quickly becomes low as the vehicle speed approaches a predetermined relatively low speed, the vehicle speed converges to such a relatively low speed that stable driving is achieved.

Since the target value of the drive shaft torques depend upon the vehicle environment in the present embodiment as mentioned above, a desired acceleration can be obtained without changing the accelerator pedal angle, if the vehicle environment is changed.

Since the target value of the drive shaft torque may be changed substantially when the modes are changed, the target drive shaft torque calculating unit 1 corrects the target drive shaft torque so that the target value of the drive shaft torque is smoothly changed when the modes are changed and outputs the corrected target value of the drive shaft torque.

Although the vehicle environment detection unit 6 selects a mode automatically in the present embodiment, modes may be manually selected by a driver. Specifically, "automatic selection" or "manual selection" is displayed on an instrument panel, for example. The driver can select a desired mode by selecting "the manual selection".

Figure 7:
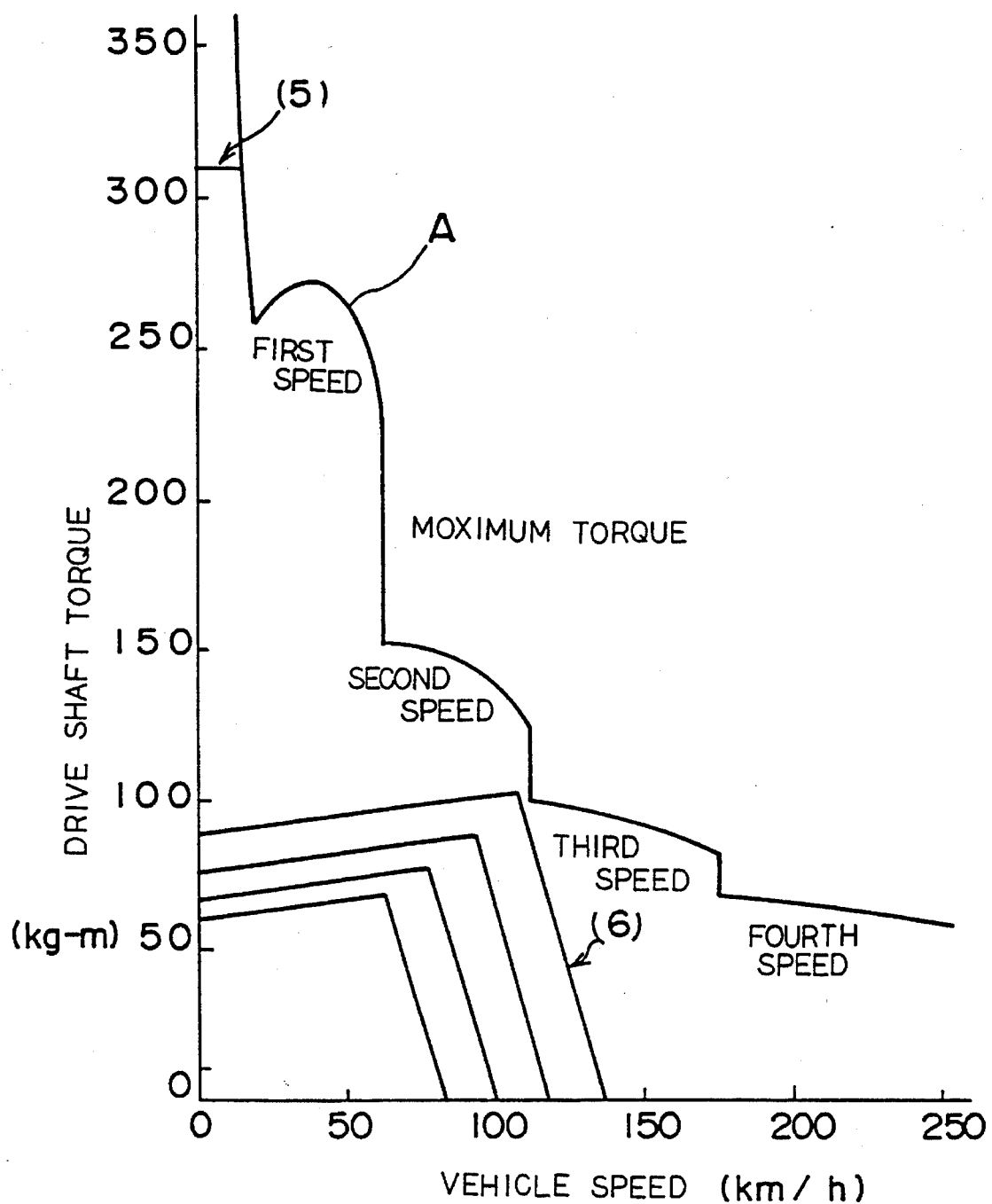
FIG. 7 is a graph showing target drive shaft torque patterns in a modification of the first embodiment of the present invention.

If a fast starting (mode in which the maximum drive shaft torque is obtained so far as an excessive load is imposed on gears or shafts on starting) and a sport running mode (in which the drive shaft torque is increased with an increase in the vehicle speed are) provided as shown in FIG. 7, an emphasized acceleration feeling which is suitable for sport running can be obtained.

Since the present embodiment has been described with reference to a gasoline engine equipped vehicle, the engine control means is an electronically controlled throttle valve 31. It is to be understood, however, that the engine output operating means is not limited to only the throttle valve 31. If the engine is a diesel engine, for example, the engine output operating means would be a fuel injection pump and an electronically controlled governor.

A second embodiment of an engine control system of the present invention will be described with reference to FIG. 8. It comprises an engine control unit 10a, a vehicle speed sensor 21 and an accelerator pedal angle or stroke sensor 22 similarly to the first embodiment.

Figure 8:
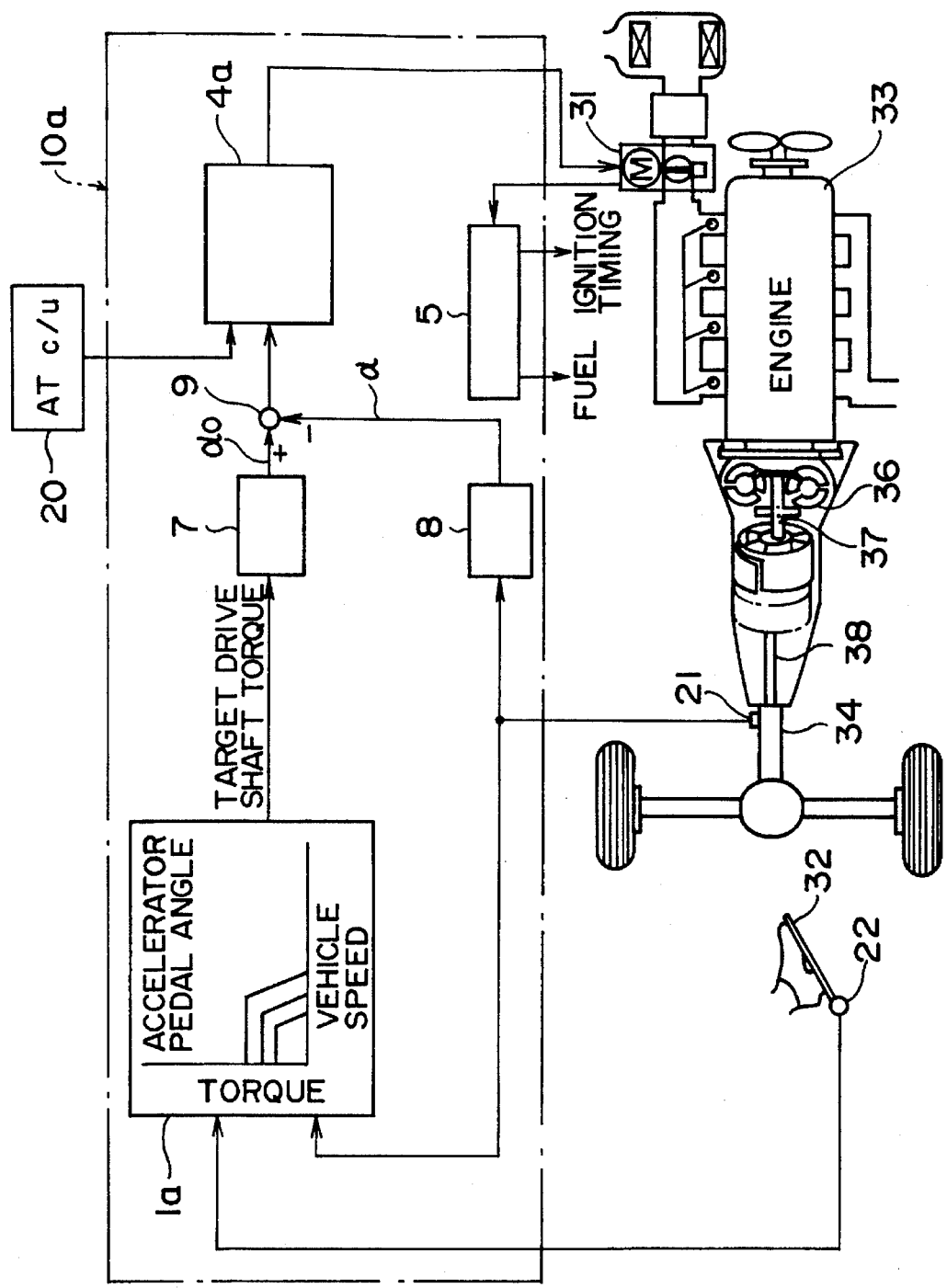
FIG. 8 is a functional block diagram showing an engine control system of a second embodiment of the present invention.

As shown in FIG. 8, the engine control unit 10a comprises a target drive shaft calculating unit 1 a for calculating a target drive shaft torque depending upon the vehicle speed and the accelerator pedal angle, a target acceleration calculating unit 7 for calculating a target acceleration corresponding to the target drive shaft torque, an actual acceleration calculating unit 8 for calculating the actual acceleration from the vehicle speed, a comparator 9 for determining an error between the actual acceleration the target acceleration and a throttle valve opening calculating unit 4a for calculating the throttle valve opening depending upon the determined error.

Figure 9:
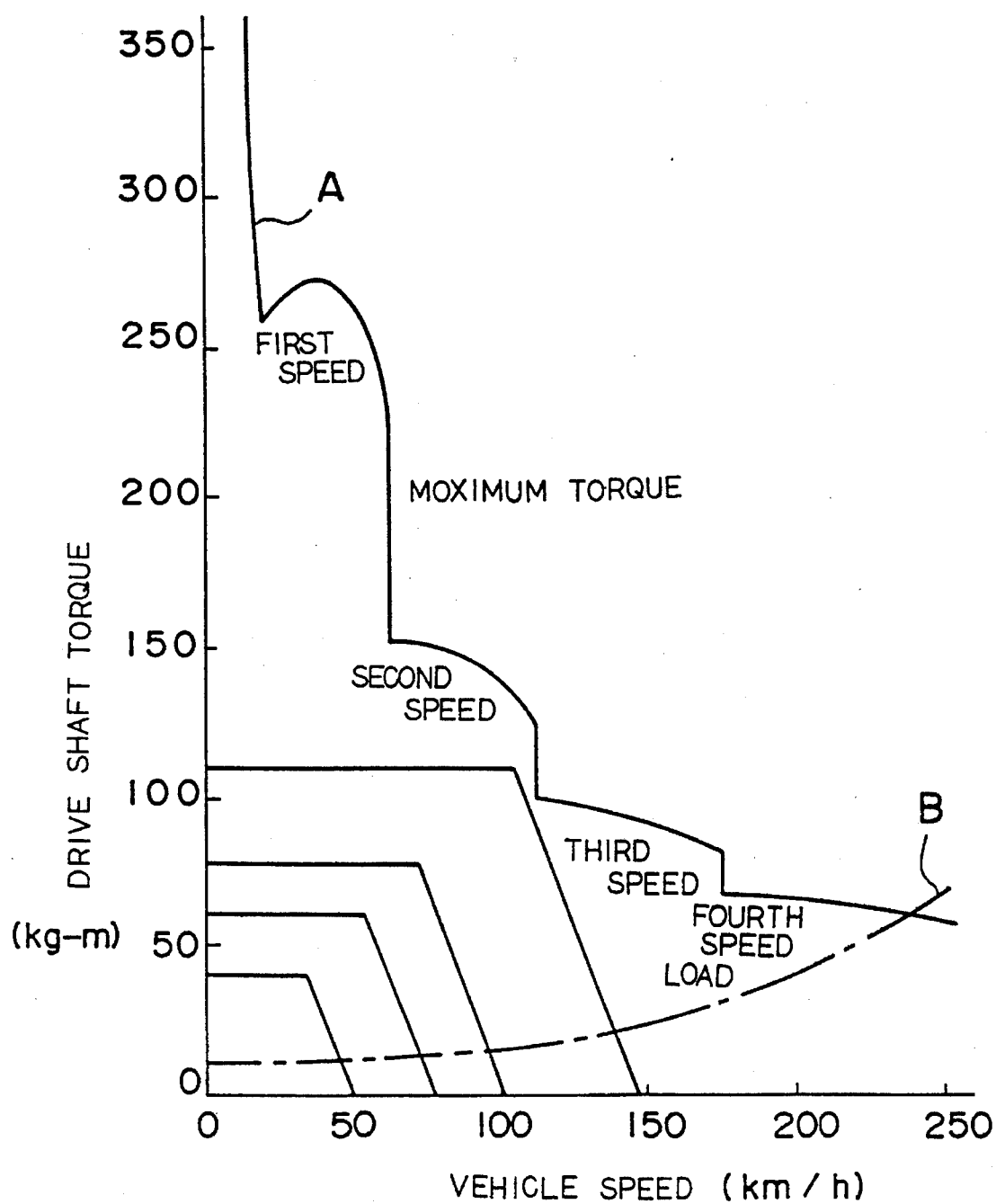
FIG. 9 is a graph showing target drive shaft torque pattern in the second embodiment of the present invention.

A target drive shaft torque pattern depending upon the vehicle speed and the accelerator pedal angle is preliminarily stored in the target drive shaft torque calculating unit 1 a as shown in FIG. 9. This target drive shaft torque pattern has a torque which in the high speed mode as shown is generally FIG. 9 in greater than that of the first embodiment. In accordance with such a target drive shaft torque pattern, a constant acceleration can be obtained over an entire range of the vehicle speed even if the vehicle speed is increased. On starting, a relatively high drive torque can be obtained, resulting in a smooth starting. Since the drive shaft torque curve intersects substantially perpendicularly with the load curve B as mentioned above, the vehicle speed converges on a down hill run and the vehicle speed stability is increased on high speed driving so that the driving safety can be enhanced.

The target drive shaft torque calculating unit 1 a determines the target drive shaft torque depending upon the outputs from the vehicle speed sensor 21 and the accelerator pedal angle sensor 22 in accordance with the target drive shaft torque pattern. The target acceleration calculating unit 7 multiplies the resultant target drive shaft torque by the reciprocal of the vehicle weight (1/M) to provide the target acceleration $\alpha 0$. On the other hand, the vehicle speed V is differentiated by the actual speed calculating unit 8 to determine the actual acceleration $\alpha$. The actual acceleration α is compared with the target acceleration α0 by the comparator 9 to determine the error (α0-α) therebetween. The throttle valve opening calculating unit 4a performs compensation operations such as proportion, integration and dumping on the error (α0-α) for calculating such a throttle valve opening that the error in acceleration is eliminated. The calculated throttle valve opening is output to the electronically controlled throttle valve 31 so that the resultant drive shaft torque traces the torque pattern which is substantially instructed by the target drive shaft torque calculating unit 1.

If the vehicle environment such as slope gradient and freight weight is changed, the throttle valve 31 is controlled in such a manner that the error between the actual acceleration and the target acceleration which occurs due to the change in the vehicle environment is eliminated. Accordingly, a constant acceleration can be obtained even if the vehicle environment is changed similarly to the first embodiment. An advantage that the drivability is not changed can be obtained. If an error occurs, the throttle valve 31 is of course controlled so that a torque which is different from the initially determined target drive shaft torque is generated in the drive shaft 34.

There is a problem that it is hard to provide a fast response since it takes an extended period of time to measure and average the vehicle speed for providing a high accuracy of acceleration when the acceleration is calculated from the vehicle speed V.

Figure 10:
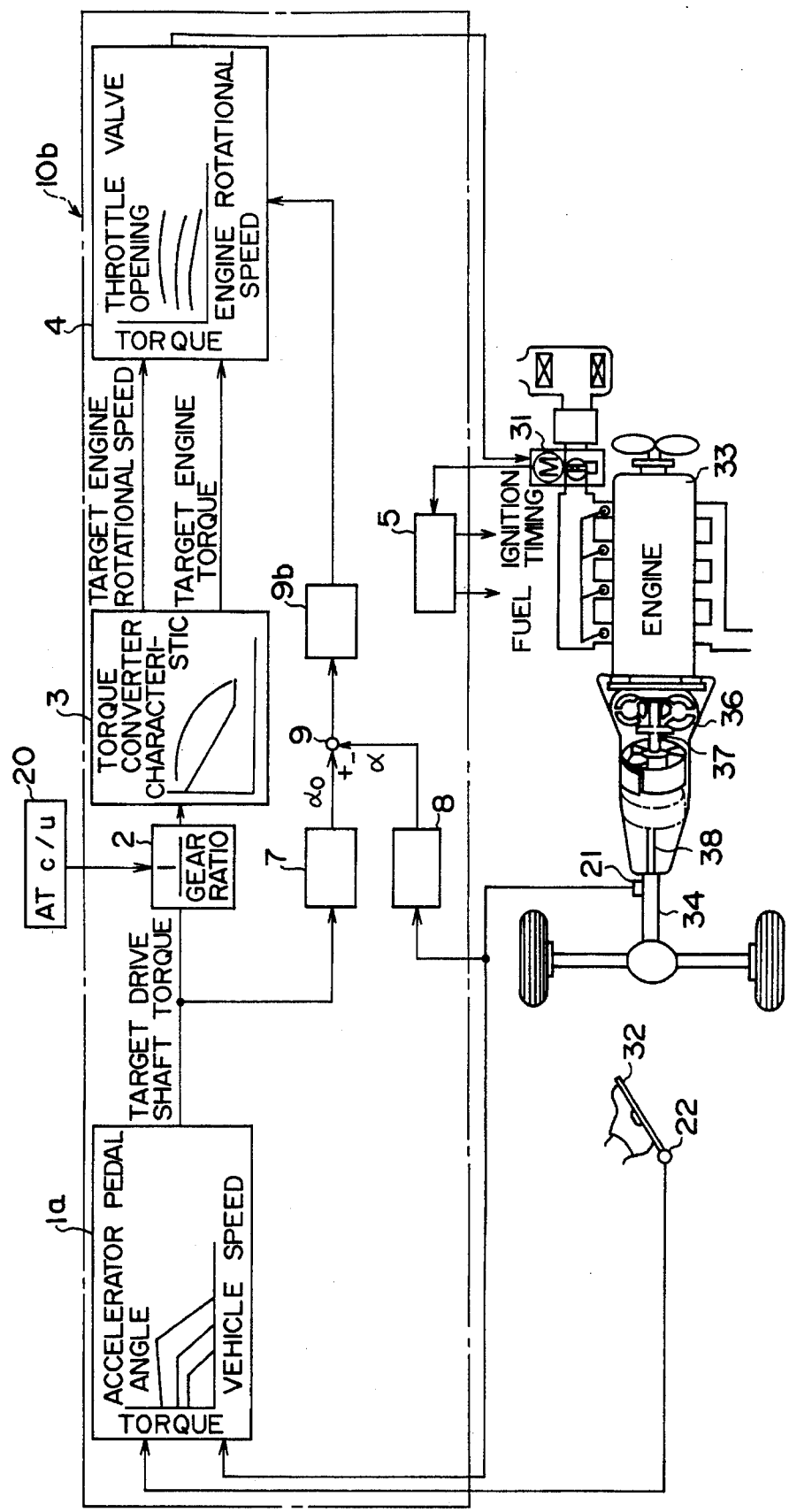
FIG. 10 is a functional block diagram showing an engine control system of a third embodiment of the present invention.
Figure 11:
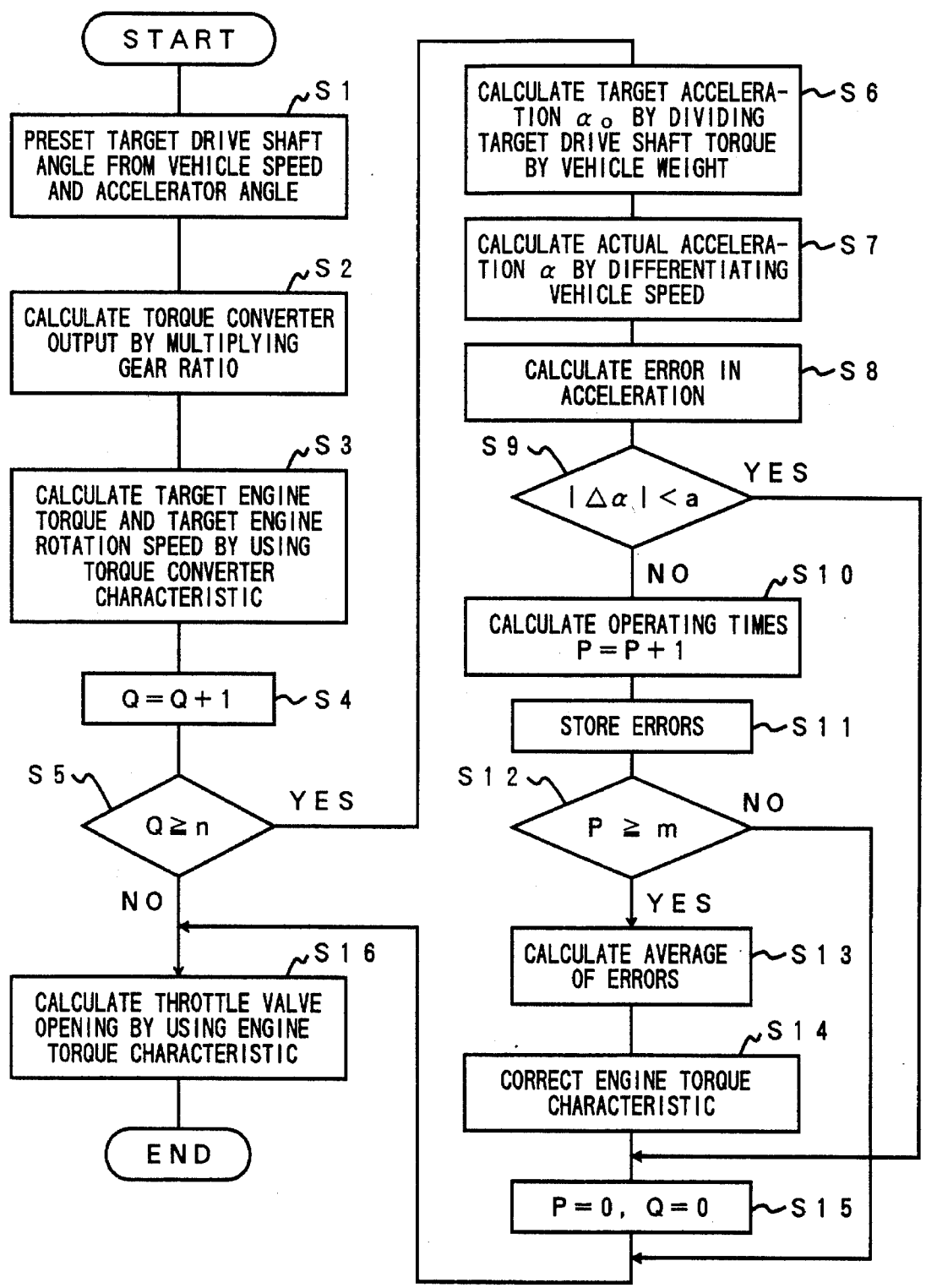
FIG. 11 is a flow chart showing operation of the engine control system of the third embodiment of the present invention.

An embodiment which is capable of coping with the changes in vehicle environment on the feedback basis of the acceleration while providing a fast response will be described with reference to FIGS. 10 and 11.

An engine control unit 10b comprises a target drive shaft torque calculating unit 1a, a transmission input shaft torque calculating unit 2, an engine torque calculating unit 3, a throttle valve opening calculating unit 4 and a fuel injection and ignition control unit 5 for controlling the fuel injection amount and ignition timing similarly to the first embodiment. The engine control unit 10b of the present embodiment further includes a target acceleration calculating unit 7 for calculating the target acceleration corresponding to the target drive shaft torque, an actual acceleration calculating unit 8 for calculating the actual acceleration from the vehicle speed, a comparator 9 for determining the error between the actual acceleration and the target acceleration and an engine torque characteristic correcting unit 9b for correcting the engine torque characteristic in the throttle valve opening calculating unit 4 in accordance with the calculated error. Target drive shaft torque patterns stored in the target drive shaft torque calculating unit 1a are the same as those in the second embodiment.

Operation of the present embodiment will be described with reference to a flow chart shown in FIG. 11.

At step 1, the target drive shaft torque is calculated from the outputs of the vehicle speed sensor 21 and the accelerator pedal angle sensor 22 in the target drive shaft torque calculating unit 1a.

At step 2, the target transmission input shaft torque is determined by converting the previously determined target drive shaft torque into the torque of a transmission input shaft 37 in accordance with information on the gear ratio given from an automatic transmission control unit (AT c/u) 20 in the transmission input shaft torque calculating unit 2 similarly to the first embodiment.

At step 3, the target engine torque and the target engine rotational speed are determined in the engine torque calculating unit 3 similarly to the first embodiment. At step 4, the number of operations Q is incremented by 1. At step 5, a determination is made as to whether the number of operations Q is equal to or more than a predetermined number n. If Q is equal to or more than n, execution then proceeds to a processing from step 6 to step 15 at which feedback control of acceleration as described with reference to the second embodiment is performed. If Q is less than n, execution then proceeds to step 16 at which the throttle opening is calculated from the target engine torque and the target engine rotational speed which has been determined at step 3 for controlling an electronically controlled throttle valve 31. In brief, feedback control of acceleration is not executed each operation of the actual acceleration, but is executed at intervals of a predetermined number of operations to reduce the number of operations of the actual acceleration.

At step 6, the target acceleration α0 is determined by multiplying the target drive shaft torque which has been determined at step 1 by the reciprocal of the vehicle weight (1/M) similarly to the second embodiment.

At step 7, the actual acceleration α is determined by differentiating the vehicle speed V which is measured by a vehicle speed sensor 21. At step 8, the error Δα (=(α0-α)) therebetween is determined.

At step 9, execution proceeds to step 10 assuming the error A Δα is an effective error (Δα is equal to or more than a predetermined value a). If the error Δα is less than a predetermined value a, a determination is made that the error Δα is not the effective error and execution proceeds to step 16.

At next step 10, the number of times of storing the acceleration error Δα is incremented by 1. At step 11, the error Δα is stored.

At step 12, a determination is made as to whether the number of times of storing the error P is equal to or more than a predetermined value m. If the number of times of storing the error is less than the predetermined value m, execution proceeds to step 16. If P is equal to or more than m, execution proceeds to step 13.

At step 13, an average value of the stored errors (ΣΔα/m) is determined. At step 15, the engine torque characteristic shown in FIG. 5 is corrected to eliminate the averaged error (ΣΔα/m). After completion of the error, counters of the number of operations Q and the number of times of storing are reset to zero at step 15 and execution then proceeds to step 16.

Since feedback control of acceleration is executed at intervals of predetermined operations in the present embodiment as mentioned above, the number of operations of the actual acceleration can be reduced in comparison with that of the second embodiment so that computer operating load can be reduced.

The vehicle environment is recognized in accordance with the present invention. The target drive shaft torque is obtained depending upon the vehicle environment. Accordingly, an acceleration which satisfies the driver's taste or at which driving is easy can be obtained even if vehicle environment is changed.

A vehicle is controlled to eliminate the error between the actual acceleration and the target acceleration even if the vehicle environment is changed so that the target acceleration is not obtained. Accordingly, the vehicle is capable of coping with the changes in vehicle environment. An acceleration which satisfies the driver's taste or at which driving is easy can be obtained.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An engine control system for controlling a vehicle engine, comprising:

engine control means for controlling engine output;

an accelerator pedal angle detector;

a vehicle speed detector;

a torque pattern memory having stored therein a plurality of target drive shaft torque patterns for respective vehicle environments, wherein target drive shaft torque is dependent upon an accelerator pedal position detected by said accelerator pedal angle detector, and upon vehicle speed detector by said vehicle speed detector;

a vehicle environment determination unit for recognizing vehicle operating environment and selecting a corresponding target drive shaft torque pattern from said plurality of target drive shaft torque patterns stored in said torque pattern memory a target drive shaft toque calculator for determining a target drive shaft torque from the selected target drive shaft torque pattern, the detected accelerator pedal position and the detected vehicle speed; and a calculator for determining an engine output parameter at which a vehicle drive shaft generates said target drive shaft torque, and for outputting the determined engine output parameter to said engine control means.

2. An engine control system as defined in claim 1, further comprising torque pattern manual selection means for enabling a driver to select a desired target drive shaft torque pattern from the plurality of target drive shaft torque patterns stored in said torque pattern memory.

3. An engine control system as defined in claim 1, wherein at least one of said target drive shaft torque patterns provides a target drive shaft torque which abruptly decreases when the vehicle speed assumes a predetermined value.

4. An engine control system as defined in claim 2, wherein at least one of said target drive shaft torque patterns provides a target drive shaft torque which abruptly decreases when the vehicle speed assumes a predetermined value.

5. An engine control system as defined in claim 1, wherein at least one of said target drive shaft torque patterns provides a target drive shaft torque sufficient to overcome a static coefficient of friction of the vehicle upon starting thereof, and a target drive shaft torque which does not change even if the vehicle speed changes after the vehicle starts moving.

6. An engine control system as defined in claim 2, wherein at least one of said target drive shaft torque patterns provides a target drive shaft torque sufficient to overcome a static coefficient of friction of the vehicle upon starting thereof, and a target drive shaft torque which does not change even if the vehicle speed changes after the vehicle starts moving.

7. An engine control system as defined in claim 3, wherein at least one of said target drive shaft torque patterns provides a target drive shaft torque sufficient to overcome a static coefficient of friction of the vehicle upon starting thereof, and a target drive shaft torque which does not change even if the vehicle speed changes after the vehicle starts moving.

8. An engine control system as defined in claim 1, wherein said vehicle environment determination unit comprises:

a vehicle speed memory wherein vehicle speed measured over a predetermined period of time is stored; and a vehicle environment discriminator for determining vehicle environment in accordance with past vehicle speed stored in said vehicle speed storing means.

9. An engine control system as defined in claim 2, wherein said vehicle environment determination unit comprises:

a vehicle speed memory wherein vehicle speed measured over a predetermined period of time is stored; and a vehicle environment discriminator for determining vehicle environment in accordance with past vehicle speed stored in said vehicle speed storing means.

10. An engine control system as defined in claim 3, wherein said vehicle environment determination unit comprises:

a vehicle speed memory wherein vehicle speed measured over a predetermined period of time is stored; and a vehicle environment discriminator for determining vehicle environment in accordance with past vehicle speed stored in said vehicle speed storing means.

11. An engine control system as defined in claim 4, wherein said vehicle environment determination unit comprises:

a vehicle speed memory wherein vehicle speed measured over a predetermined period of time is stored; and a vehicle environment discriminator for determining vehicle environment in accordance with past vehicle speed stored in said vehicle speed storing means.

12. An engine control system for controlling a vehicle engine, comprising:

engine control means for controlling engine output;

an accelerator pedal angle detector;

a vehicle speed detector;

a torque pattern memory having stored therein target drive shaft torque patterns wherein target drive shaft torque is dependent upon an accelerator pedal position detected by said accelerator pedal angle detector, and upon vehicle speed detected by said vehicle speed detector;

a target drive shaft torque calculator for determining a target drive shaft torque from said target drive shaft torque patterns, the detected accelerator pedal position and the detected vehicle speed;

a target acceleration calculator for determining a target acceleration by dividing the determined target drive shaft torque by vehicle weight;

a vehicle acceleration detector;

acceleration error calculating means for determining an error between said target acceleration and a vehicle accelerator determined by said vehicle acceleration detector; and a calculator for determining an engine output parameter at which said determined error decreases, and for providing a signal indicative of the determined engine output parameter to said engine control means.

13. An engine control system for controlling a vehicle engine, comprising:

engine control means for controlling engine output;

an accelerator pedal angle detector;

a vehicle speed detector;

a torque pattern memory having stored therein target drive shaft torque patterns, wherein target drive shaft torque is dependent upon an accelerator pedal position detected by said accelerator pedal angle detector and upon vehicle speed detected by said vehicle speed detector;

an engine output pattern memory for storing an engine output pattern representative of a relationship between drive shaft torque and engine output;

target drive shaft torque calculator for determining a target drive shaft torque from said target drive shaft torque patterns, said detected accelerator pedal position and the detected vehicle speed;

a calculator for determining an engine output parameter from said target drive shaft torque and said engine output pattern, and for providing said engine output parameter to said engine control means.

an acceleration calculator for determining vehicle acceleration based upon said vehicle speed at predetermined time intervals;

a target acceleration calculator for determining a target acceleration by dividing said determined drive shaft torque by vehicle output;

acceleration error calculating means for determining an error between said target acceleration and said vehicle acceleration; and engine output parameter correcting means for correcting said engine output parameter so that said determined error decreases.

14. A method of controlling a vehicle engine comprising the steps of:

storing a plurality of target drive shaft torque patterns wherein target drive shaft torque is dependent upon accelerator pedal position of said vehicle and vehicle speed, for each of various vehicle environments;

detecting a vehicle environment;

selecting a target drive shaft torque pattern corresponding to detected vehicle environment from said stored plurality of target drive shaft torque patterns;

detecting an accelerator pedal position of said vehicle;

detecting a vehicle speed of said vehicle;

determining a target drive shaft torque from said selected target drive shaft torque pattern, said accelerator pedal position and said vehicle speed;

determining an engine output parameter at which a vehicle drive shaft generates said target drive shaft torque; and providing a signal indicative of said engine output parameter to an engine control.

15. A method of controlling an engine comprising the steps of:

storing a target drive shaft torque patterns wherein target drive shaft torque is dependent upon accelerator pedal position of said vehicle and vehicle speed;

detecting an accelerator pedal position of said vehicle;

detecting a vehicle speed of said vehicle;

determining a target drive shaft torque from said target drive shaft torque pattern, said accelerator pedal position and said vehicle speed;

determining a target acceleration by dividing said target drive shaft by vehicle speed;

calculating an error between said target acceleration and actual vehicle acceleration;

determining an engine output parameter at which a vehicle drive shaft generates said target drive shaft torque; and outputting said engine output parameter to an engine control.

* * * * *